United States Patent
Breitfuss et al.

(10) Patent No.: US 9,727,767 B2
(45) Date of Patent: Aug. 8, 2017

(54) CLOCK SYNCHRONIZATION IN AN RFID EQUIPPED DEVICE

(71) Applicant: NXP B.V., Eindhoven (NL)

(72) Inventors: Klemens Breitfuss, Voitsberg (AT); Peter Thueringer, Gratkorn (AT)

(73) Assignee: NXP B.V., Eindhoven (NL)

( * ) Notice: Subject to any disclaimer, the term of this patent is extended or adjusted under 35 U.S.C. 154(b) by 520 days.

(21) Appl. No.: 13/795,483

(22) Filed: Mar. 12, 2013

(65) Prior Publication Data
US 2014/0266611 A1    Sep. 18, 2014

(51) Int. Cl.
| | |
|---|---|
| *G06K 7/10* | (2006.01) |
| *H04B 5/00* | (2006.01) |
| *H04L 7/00* | (2006.01) |
| *G06K 19/07* | (2006.01) |
| *G06K 19/077* | (2006.01) |
| *H04J 3/06* | (2006.01) |
| *H04L 7/033* | (2006.01) |

(52) U.S. Cl.
CPC ..... G06K 7/10386 (2013.01); G06K 19/0727 (2013.01); G06K 19/07749 (2013.01); H04B 5/0062 (2013.01); H04L 7/0012 (2013.01); *H04B 5/0081* (2013.01); *H04J 3/0685* (2013.01); *H04L 7/0331* (2013.01)

(58) Field of Classification Search
CPC ............ G06K 7/10386; G06K 7/0008; G06K 19/0723; G06K 19/07749; G06K 19/0727; G06F 1/12; H04B 5/0062; H04L 7/10; H04L 7/0012; H04J 3/06; H04N 21/242
See application file for complete search history.

(56) References Cited

U.S. PATENT DOCUMENTS

| | | | | |
|---|---|---|---|---|
| 4,708,491 A | * | 11/1987 | Luitje ........................... | 368/156 |
| 5,313,496 A | * | 5/1994 | de Goede ..................... | 375/342 |
| 5,402,420 A | * | 3/1995 | Kobayashi .......... | H04L 12/4135 |
| | | | | 370/212 |
| 5,649,296 A | * | 7/1997 | MacLellan et al. ............ | 455/39 |

(Continued)

FOREIGN PATENT DOCUMENTS

| | | |
|---|---|---|
| CN | 101408924 A | 4/2009 |
| CN | 101558328 A | 10/2009 |

(Continued)

OTHER PUBLICATIONS

Extended European Search Report for counterpart Patent Appin. No. 14156953.3 (Jun. 8, 2017).

*Primary Examiner* — Yong Hang Jiang

(57) ABSTRACT

Embodiments of a method for clock synchronization in a radio frequency identification (RFID) equipped device, an RFID equipped device, and a hand-held communications device are described. In one embodiment, a method for clock synchronization in an RFID equipped device involves measuring a difference between a field clock frequency generated from an external clock and an internal clock frequency generated from an internal clock and generating outgoing bits in the RFID equipped device in response to the measured difference. Generating the outgoing bits involves adjusting the bit length of at least one of the outgoing bits in response to the measured difference. Other embodiments are also described.

18 Claims, 6 Drawing Sheets

(56) References Cited

U.S. PATENT DOCUMENTS

| | | | | |
|---|---|---|---|---|
| 5,896,394 | A | * | 4/1999 | Fukuda ................ H04L 1/1664 |
| | | | | 714/712 |
| 6,606,211 | B1 | * | 8/2003 | Lim et al. ....................... 360/53 |
| 2007/0046468 | A1 | * | 3/2007 | Davis ......................... 340/572.1 |
| 2007/0264026 | A1 | * | 11/2007 | Miguel ................. H03K 5/135 |
| | | | | 398/155 |
| 2008/0064346 | A1 | * | 3/2008 | Charrat ......................... 455/131 |
| 2011/0032081 | A1 | | 2/2011 | Wild |
| 2012/0071089 | A1 | | 3/2012 | Charrat et al. |

FOREIGN PATENT DOCUMENTS

| | | |
|---|---|---|
| CN | 101667167 A | 3/2010 |
| WO | 96/23308 | 8/1996 |
| WO | 02/05504 A1 | 1/2002 |

\* cited by examiner

CLOCK SYNCHRONIZATION IN AN RFID EQUIPPED DEVICE

Embodiments of the invention relate generally to processing systems and methods and, more particularly, to systems and methods for clock synchronization.

A radio frequency identification (RFID) equipped device includes embedded integrated circuits that can be used to store information. For example, RFID tags are used in financial, transportation, security, healthcare, or other applications to provide identification and authentication information. An RFID equipped device includes an antenna, such as an inductor type antenna, to receive and transmit wireless signals via magnetic or electromagnetic fields.

Hand-held communications devices, such as smartphones, increasingly include built-in RFID modules for identification and authentication. However, integrating an RFID module into a mobile device poses challenges. For example, an RFID module typically has an antenna with a large physical dimension, such as around 8×5 centimeters (cm). Fitting a large antenna into a compact hand-held device is challenging. To make an RFID module suitable for a hand-held device, the antenna dimensions of the RFID module need to be in an acceptable range, such as around 1×1 cm. However, reducing the antenna size of an RFID module reduces the antenna coupling factor and, consequently, decreases the sideband levels of the corresponding wireless signals. When the sideband levels of the corresponding wireless signals decrease below a certain threshold, load modulation usually cannot be used to modulate outgoing signals of the RFID module.

To cope with the decreased sideband levels in an RFID module, active modulation can be used to modulate outgoing wireless signals. Compared to load modulation that involves changing the energy taken out of an electromagnetic field, active modulation involves generating an electromagnetic field and transmitting signals through the electromagnetic field. Typically, active modulation uses at least one active component, such as, an amplifier or an oscillator, to generate or transmit modulated signals. Active modulation may involve an analog modulation scheme, such as, amplitude modulation (AM), frequency modulation (FM) or phase modulation (PM), or a digital modulation scheme, such as, amplitude shift keying (ASK), frequency shift keying (FSK), or phase shift keying (PSK). However, implementing active modulation in an RFID equipped device requires accurate clock synchronization.

Embodiments of a method for clock synchronization in an RFID equipped device, an RFID equipped device, and a hand-held communications device are described. In one embodiment, a method for clock synchronization in an RFID equipped device involves measuring a difference between a field clock frequency generated from an external clock and an internal clock frequency generated from an internal clock and generating outgoing bits in the RFID equipped device in response to the measured difference. Generating the outgoing bits involves adjusting the bit length of at least one of the outgoing bits in response to the measured difference. Adjusting bit length of at least one of the outgoing bits in response to the measured clock difference allows the average bit length error of the outgoing bits to be kept within an acceptable level. By keeping the average bit length error of the outgoing bits within an acceptable level, an external wireless device can achieve a stable reception of modulated bits. Other embodiments are also described.

In an embodiment, a method for clock synchronization in an RFID equipped device includes measuring a difference between a field clock frequency generated from an external clock and an internal clock frequency generated from an internal clock and generating outgoing bits in the RFID equipped device in response to the measured difference. Generating the outgoing bits includes adjusting the bit length of at least one of the outgoing bits in response to the measured difference.

In an embodiment, an RFID equipped device includes a clock difference measurement unit configured to measure a difference between a field clock frequency generated from an external clock and an internal clock frequency generated from an internal clock and a modulator configured to generate outgoing bits in response to the measured difference. The modulator includes a bit length adjustment unit configured to adjust the bit length of at least one of the outgoing bits in response to the measured difference.

In an embodiment, a hand-held communications device includes a crystal oscillator configured to provide an internal clock signal and a Near Field Communication (NFC) module. The NFC module includes an antenna configured to receive NFC wireless signals, a clock difference measurement unit configured to derive an external field clock frequency from the received NFC wireless signals and to measure a difference between the external field clock frequency and an internal clock frequency of the internal clock signal, and a modulator configured to generate outgoing bits in response to the measured difference. The modulator includes a bit length adjustment unit configured to add a clock period to one of the outgoing bits or remove a clock period from one of the outgoing bits in response to the measured difference.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
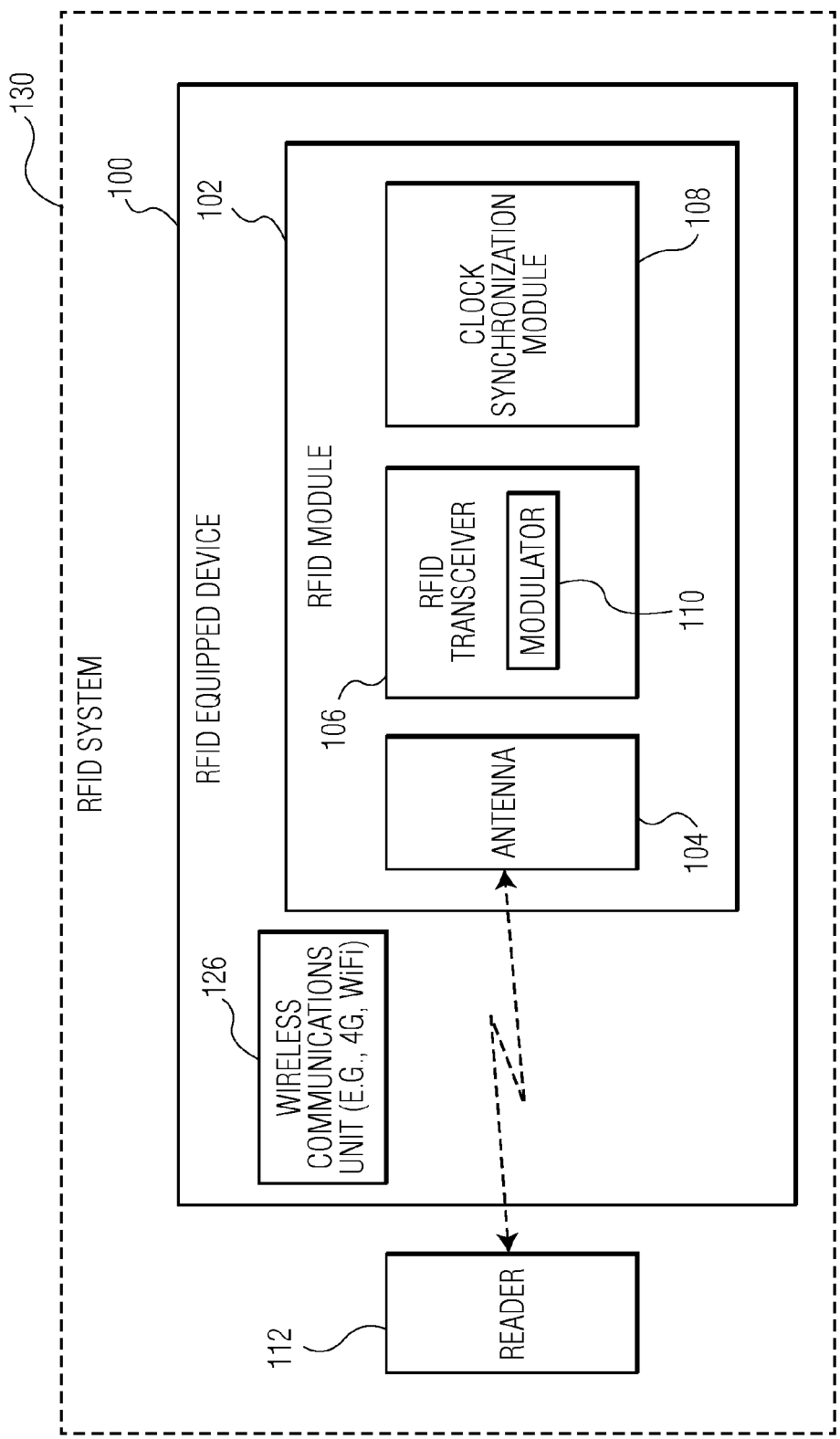
FIG. 1 is a schematic block diagram of an RFID equipped device in accordance with an embodiment of the invention.

FIG. 1 is a schematic block diagram of an RFID equipped device 100 in accordance with an embodiment of the invention. The RFID equipped device may be used in financial, transportation, security, healthcare, or other applications in an RFID system 130 to provide identification and authentication. In the embodiment depicted in FIG. 1, the RFID equipped device communicates wirelessly using magnetic or electromagnetic fields with a reader 112 to form the RFID system 130. The data communications of the RFID equipped device can be achieved using the magnetic or electromagnetic fields without the use of physical contacts. In an embodiment, the RFID equipped device is used in Near Field Communication (NFC) applications. For example, the RFID equipped device and the reader communicate via the NFC communications standard as defined by the International Organization for Standardization (ISO) and the International Electrotechnical Commission (IEC) 14443 standard. In one embodiment, the RFID equipped device includes an internal power source (not shown), which can be a battery, such as a lithium-ion battery. However, in some other embodiments, such as smart cards, the RFID equipped device may not include an internal power source, in which case power is generated by induction.

The RFID equipped device 100 may be a portable or hand-held communications device, such as a smartphone, a tablet computer, a laptop, etc. In the embodiment depicted in FIG. 1, the RFID equipped device 100 includes an RFID module 102 that supports RFID communications. In addition to the RFID module 102, the RFID equipped device 100 may also include another wireless communications unit 126, which is configured to facilitate wireless communications between the RFID equipped device 100 and another wireless communications device, e.g., 3G, 4G, and/or WiFi devices. For example, the wireless communications unit can support various different RF communications protocols, including without limitation, GSM, UMTS, CDMA, WiMax and communications protocols as defined by 3GPP, 3GPP2, or IEEE 802.16. The wireless communications unit 126 is optional. In some embodiments, the RFID equipped device 100 does not include the wireless communications unit 126. For example, the RFID equipped device 100 may be an RFID card or other NFC device that does not have 3G, 4G, or WiFi communications capabilities.

The RFID module 102 can be embodied in various physical forms. For example, the RFID module 102 may include an Integrated Circuit (IC) chip, such as an NFC IC chip, and an antenna unit. In some embodiments, the RFID module 102 may be a smart card that has the ability to securely manage, store and provide access to data on the card, perform on-card functions, such as encryption, authentication, and authorization, and interact intelligently with a smart card reader. In the embodiment depicted in FIG. 1, the RFID module 102 includes an antenna 104, an RFID transceiver 106, and a clock synchronization module 108.

The antenna 104 of the RFID module 102 is configured to receive/send wireless signals from/to the reader 112, which can be a smart card reader or other information interrogators. The antenna, which may be an NFC antenna, can communicate via magnetic or electromagnetic fields. In an embodiment, the antenna is a coil type antenna that captures an interrogation signal from the reader to power the RFID module 102.

For the reader 112, the length of each bit that is received from the RFID module 102 needs to be maintained within an acceptable threshold. For the RFID equipped device 100, keeping data bits at a uniform length is also referred to as holding the bitgrid. Holding the bitgrid at the RFID equipped device 100 is essential for proper reception and demodulation at the reader. If consecutive bits have a length error, the length errors can sum up. For example, if on average a bit has an incorrect length of around 1%, after transmitting 10 bits, the length error is 10% of the length of a single bit. In an embodiment in accordance with the invention, the RFID RFID module can hold the bitgrid using the RFID transceiver 106 and the clock synchronization module 108, as described in further details below.

The RFID transceiver 106 of the RFID module 102 is configured to process received signals from the antenna 104 and/or to generate output signals for the antenna. The RFID transceiver includes a modulator 110 configured to modulate or modify a carrier signal, such as a carrier waveform, with a modulating signal to generate a modulated signal. The modulating signal is also referred to as the modulation signal. In the embodiment depicted in FIG. 1, the modulating signal represents digital bits that carry information to be conveyed. In an embodiment, the modulator is configured to modulate the outgoing bits with a carrier signal using active modulation to generate modulated signals in the RFID equipped device 100. In active modulation, an electromagnetic field is generated and an actively modulated signal is transmitted through the electromagnetic field.

In addition to the modulator 110, the RFID transceiver 106 may include an additional component, such as an analog front-end, a digital signal processing (DSP) unit, and/or a processor. For example, the RFID transceiver may include an analog front-end configured to process and convert the received analog signals from the antenna into digital signals, a DSP unit configured to perform digital signal processing on digital signals from the analog front-end, and/or a processor configured to process digital signals from the DSP unit according to one or more protocols. The processor can be a microprocessor such as a central processing unit (CPU) that provides microinstruction and data processing capability for the RFID module 102. Examples of the protocols that can be used by the processor include, but are not limited to, one or more communication protocol stacks, cryptographic protocols, and data compression protocols.

The clock synchronization module 108 is used for clock synchronization of the RFID equipped device 100. The RFID equipped device 100 has an internal clock source, such as a stable clock source provided by a crystal oscillator. In addition to the internal clock source, the RFID equipped device 100 obtains a field clock frequency generated from an external clock, such as the reader 112. For example, the RFID module 102 can derive the field clock frequency from wireless signals received from the antenna 104 that are sent, for example, from the reader 112. To make the RFID equipped device a synchronous device, the clock synchronization module keeps the field clock frequency close to the internal clock frequency. For example, the clock synchronization module keeps the field clock timing within a tolerance relative to an elementary time unit (ETU), which is typically the length of a single modulating bit, of the internal clock timing. In an embodiment, if the position of a modulating bit within a data frame differs from an ideal position by less than ¼ of an elementary time unit, the reader 112 can reliably receive and decode the modulating bit.

Generally, the external RF field clock is switched on before a signal is transmitted from the RFID equipped device 100. Within the time period between the switching on of the field clock and the signal transmission from the RFID equipped device, an exact measurement of the difference between the field clock frequency and the internal clock frequency can be made. In an embodiment, the clock synchronization module 106 synchronizes the RFID equipped device 100 by measuring the difference between the field clock frequency and the internal clock frequency of the RFID equipped device and causing the bit length of at least one of modulating bits (i.e., outgoing bits to be modulated by the carrier signal) to be set in response to the difference between the field clock frequency and the internal clock frequency. The RFID equipped device can adjust the bit length of at least one of the outgoing bits, for example, by adding one or more clock periods to at least one outgoing bit or removing one or more clock periods from at least one modulated bit. In some embodiments, the RFID equipped device adjusts the bit length of at least one of the outgoing bits to keep the average bit length error within an acceptable level. By keeping the average bit length error of data frames within an acceptable level, the reader 112 can reliably decode the modulated bits.

Figure 2:
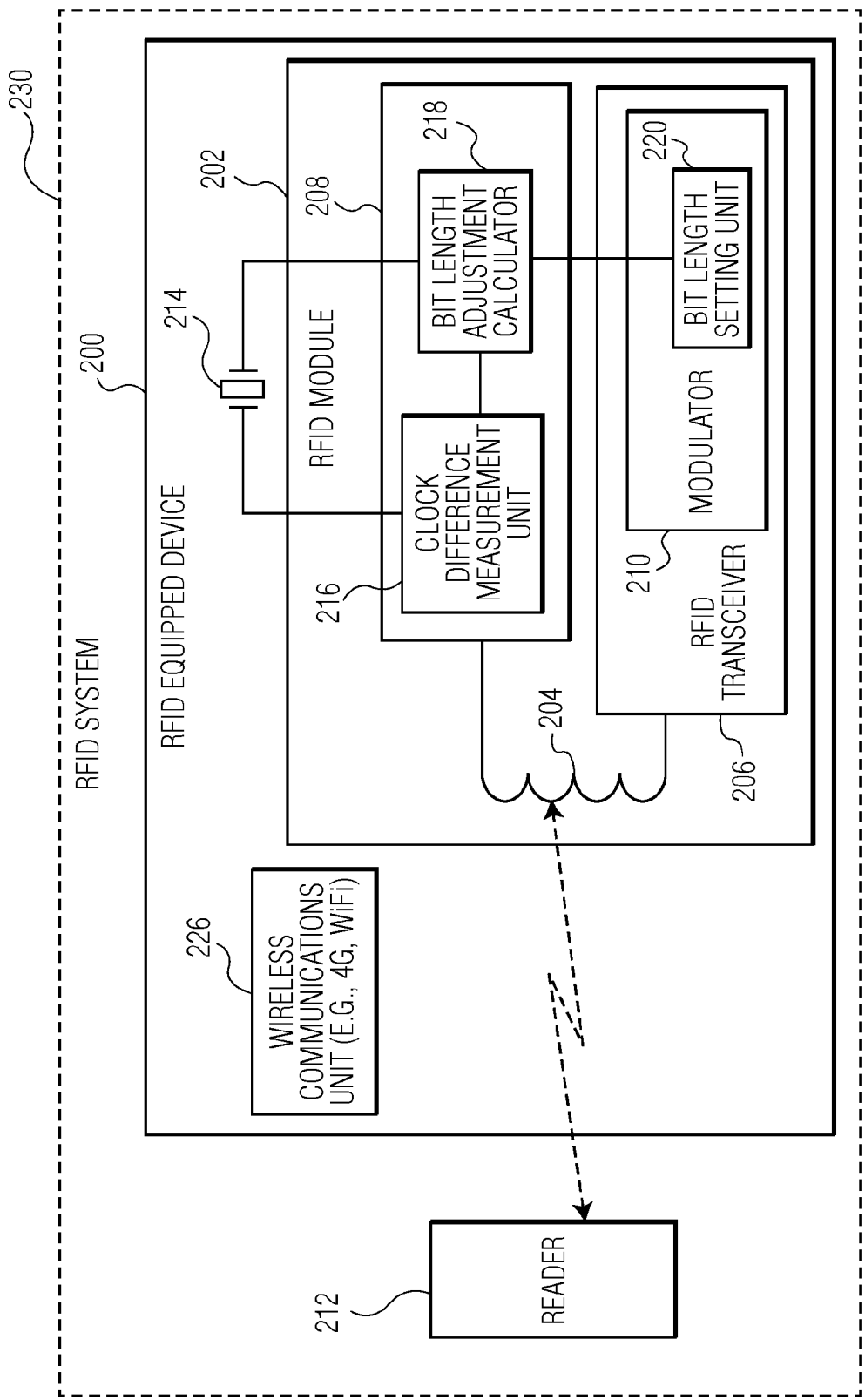
FIG. 2 depicts an embodiment of the RFID equipped device depicted in FIG. 1.

FIG. 2 depicts an embodiment of the RFID equipped device 100 depicted in FIG. 1 that is configured to measure the difference between a field clock frequency and an internal clock frequency and to adjust the bit length of outgoing bits accordingly. In the embodiment depicted in FIG. 2, an RFID equipped device 200 and a reader 212 form an RFID system 230. The RFID equipped device 200 includes an RFID module 202 that can communicate with and be powered by the reader 212 and an optional wireless communications unit 226 that is configured to facilitate wireless communications using, for example, 3G, 4G, and/or WiFi. In some embodiments, the RFID equipped device 200 does not include the wireless communications unit 226. For example, the RFID equipped device 200 may be an RFID card or other NFC device that does not have 3G, 4G, or WiFi communications capabilities. The RFID module 202 may include an IC chip, such as an NFC IC chip, and an antenna unit. In an embodiment, the RFID module 202 and the reader 212 communicate via the NFC communications standard as defined by the International Organization for Standardization (ISO) and the International Electrotechnical Commission (IEC) 14443 standard. In some cases, the RFID module 202 is a contactless smart card that does not include an internal power source but uses an inductor-type antenna to capture an electromagnetic interrogation signal to power the smart card's electronic circuits.

The RFID module 202 includes a coil antenna 204, an RFID transceiver 206, and a clock synchronization module 208. The coil antenna 204 is configured to receive wireless signals from the reader 212 and to transmit wireless signals to the reader. The clock synchronization module 208 includes a clock difference measurement unit 216 and a bit length adjustment calculator 218. The clock difference measurement unit 216 is configured to derive an external field clock frequency from wireless signals that are received from the reader and to measure a difference between the field clock frequency and an internal clock frequency of an internal clock source that is provided by an oscillator 214. The bit length adjustment calculator 218 is configured to calculate bit length adjustment of the outgoing bits in response to the measured difference. The clock synchronization module 208 can be implemented as a processor, such as a microprocessor or microcontroller.

The RFID transceiver 206 of the RFID module 202 includes a modulator 210 configured to generate modulated signals using active modulation in response to the measured difference from the clock difference measurement unit 216. In the embodiment depicted in FIG. 2, the modulator 210 includes a bit length setting unit 220 configured to set/adjust the bit length of at least one of the outgoing bits in response to the measured difference. The modulator 210 can modulate the outgoing bits with a carrier signal to generate modulated signals.

In an embodiment, the bit length setting unit 220 adds one or more clock periods to at least one of the outgoing bits or removes one or more clock periods from at least one of the outgoing bits in response to the measured clock difference. The bit length setting unit can add/remove bit clock periods such that an average bit length error of the outgoing bits is below a predefined threshold. For example, the bit length setting unit can add/remove bit clock periods such that the average bit length error over a predetermined number of data frames is below a threshold. In an exemplary operation, the bit length setting unit adds a clock period to an outgoing bit if the external field clock frequency is lower than the internal clock frequency provided by the oscillator 214 and removes a clock period from an outgoing bit if the field clock frequency is higher than the internal clock frequency. A single clock period can be added or removed in between a data bit frame without negatively impacting bit decoding. Although the length error can change with every bit, the average bit length error per data frame stays below the acceptable level.

Figure 3:
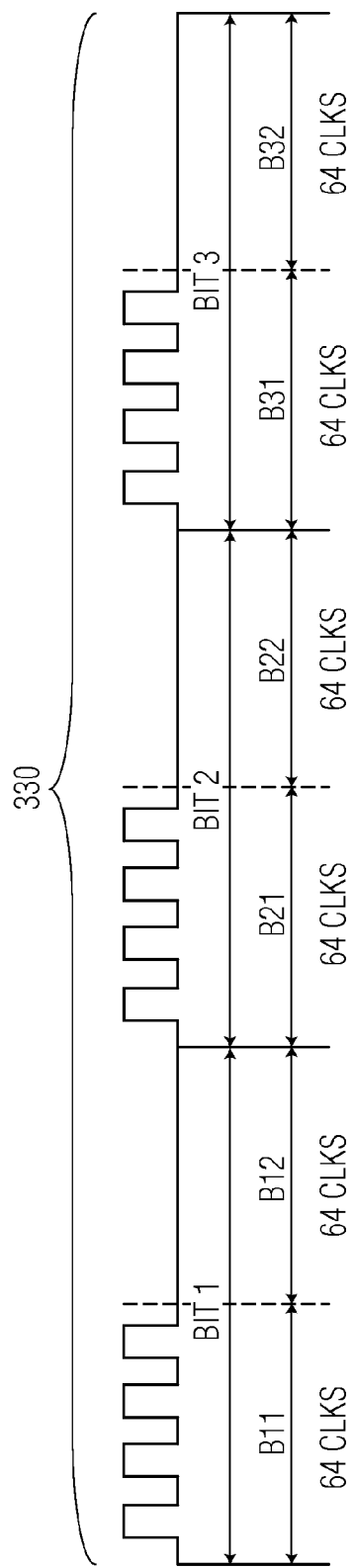
FIGS. 3-5 depict example bit frames that are generated in the RFID equipped device of FIG. 2 before and after clock synchronization.
Figure 4:
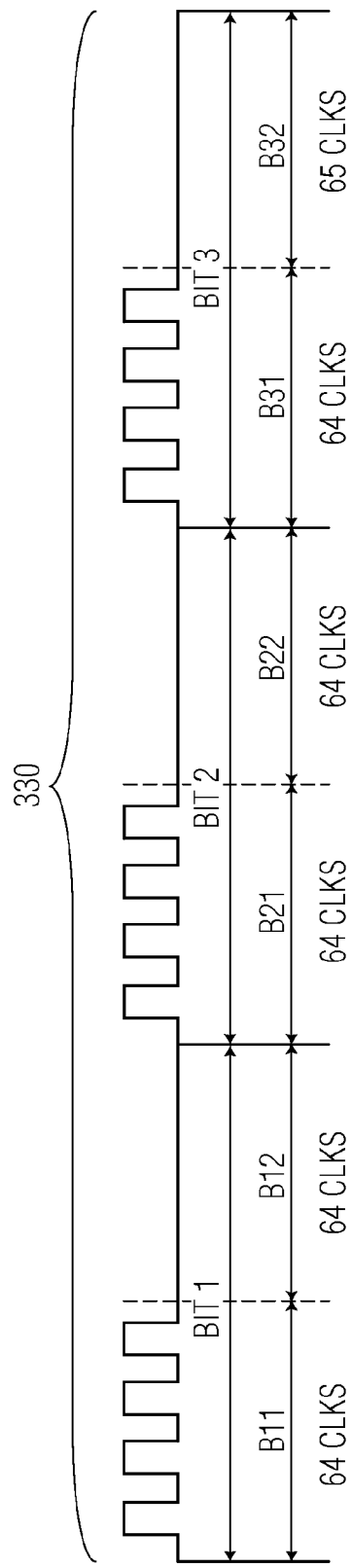
Figure 5:
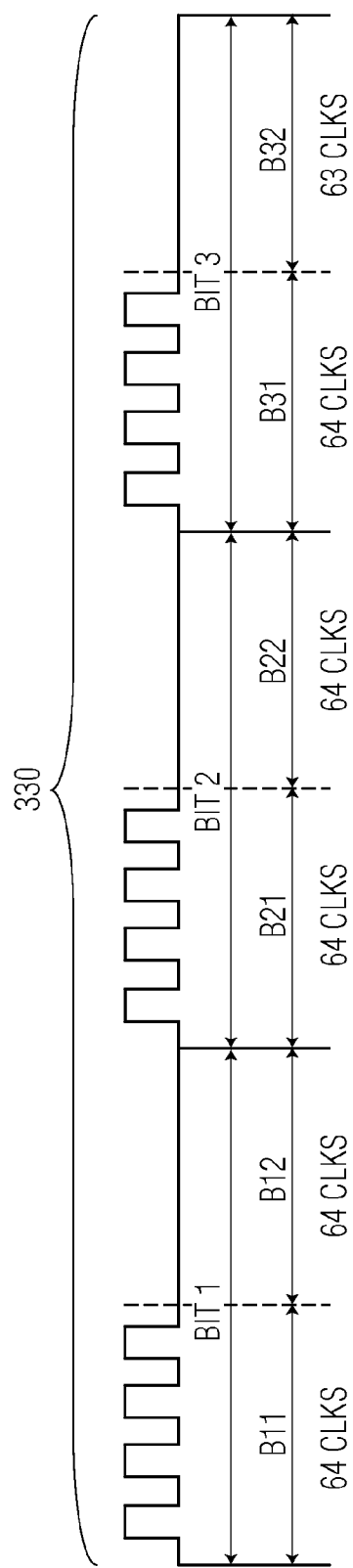

FIGS. 3-5 depict example bit frames that are generated in the RFID module 202 before and after clock synchronization. In the embodiment depicted in FIGS. 3-5, the carrier signal of the modulator 210 has a frequency of around 73.56 MHz while the modulating signal (i.e., the outgoing bits that carry information to be conveyed) of the modulator has a frequency of around 848 KHz. Bits 1, 2, and 3 are located within a data frame 330. Each bit has a bit length of around 128 clock periods and includes a shifting signal section B11, B21, or B31 and a non-shifting signal section B12, B22, or B32.

FIG. 3 depicts the three bits in the data frame 330 before clock synchronization. In the embodiment depicted in FIG. 3, bit 1 includes a shifting signal section B11 and a non-shifting signal section B12, bit 2 includes a shifting signal section B21 and a non-shifting signal section B22, and bit 3 includes a shifting signal section B31 and a non-shifting signal section B32. Each of the signal sections B11, B21, B31, B12, B22, B32 has 64 clock periods.

A wireless device, such as the reader 212, needs to detect the envelope of the signals from the RFID equipped device 200. To allow the wireless device to correctly detect the envelope of the signals from the RFID equipped device 200, a tolerance threshold of bit length fluctuation is set for the modulator. Generally, a wireless device can tolerate a length error, for example, between 10% and 25% of a single bit length. For a bit with 128 clock periods, 10% of a single bit length is around 13 clocks. For each bit, one or more clock periods can be added or removed from a bit while the length error of the bit is still below the typical length error tolerance. Consequently, the bit length of outgoing bits can be adjusted without affecting the proper decoding of the bits.

FIG. 4 depicts the data frame 330 after clock synchronization when the internal clock frequency is determined to be higher than the field clock frequency. In the embodiment depicted in FIG. 4, a clock period is added to one of the bits in the data frame 330. Specifically, one clock period is added to the non-shifting signal section B32 of bit 3. After bit length adjustment, bit 1, bit 2, and bit 3 have 128, 128, and 129 clock periods, respectively. The bit length adjustment can reduce the average bit length error over a number of data frames.

FIG. 5 depicts the data frame 330 after clock synchronization when the internal clock frequency is determined to be lower than the field clock frequency. In the embodiment depicted in FIG. 5, a clock period is removed from one of the bits in the data frame 330. Specifically, one clock period is removed from the non-shifting signal section B32 of bit 3. After bit length adjustment, bit 1, bit 2, and bit 3 have 128, 128, and 127 clock periods, respectively. The bit length adjustment can reduce the average bit length error over a number of data frames. Although the bit length of bit 3 in the data frame 330 is adjusted in the embodiments depicted in FIGS. 4 and 5, in some embodiments, the length of bit 1 or bit 2 is adjusted. In addition, although the bit length of one bit in the data frame 330 is adjusted in the embodiments depicted in FIGS. 4 and 5, in some embodiments, it may be necessary to adjust more than one bit.

Figure 6:
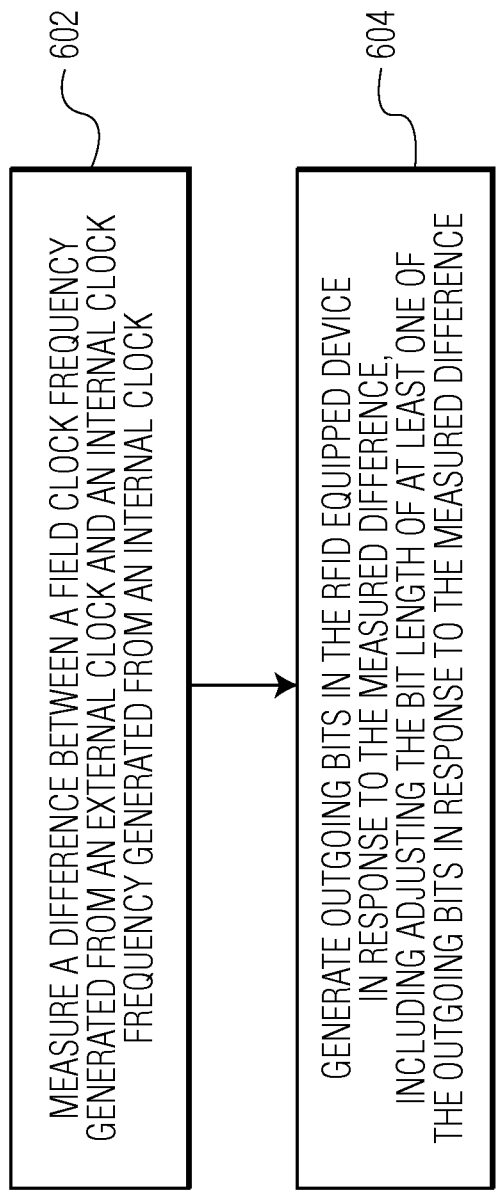
FIG. 6 is a process flow diagram that illustrates a method for clock synchronization in an RFID equipped device in accordance with an embodiment of the invention.

FIG. 6 is a process flow diagram that illustrates a method for clock synchronization in an RFID equipped device in accordance with an embodiment of the invention. The RFID equipped device may be the RFID equipped device 100 depicted in FIG. 1 or the RFID equipped device 200 depicted in FIG. 2. At block 602, a difference between a field clock frequency generated from an external clock and an internal clock frequency generated from an internal clock is measured. At block 604, outgoing bits are generated in the RFID equipped device in response to the measured difference. In particular, the bit length of at least one of the outgoing bits is adjusted in response to the measured difference.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for clock synchronization in a radio frequency identification (RFID) equipped device, the method comprising:
   measuring a difference between a field clock frequency generated from an external clock and an internal clock frequency generated from an internal clock; and
   generating outgoing bits in the RFID equipped device in response to the measured difference, wherein generating the outgoing bits comprises adjusting the bit length of at least one of the outgoing bits in response to the measured difference while keeping an average bit length error of the outgoing bits below a predefined percentage threshold, wherein adjusting the bit length of at least one of the outgoing bits comprises adding a clock period to a non-shifting signal section of at least one of the outgoing bits or removing a clock period from a non-shifting signal section of at least one of the outgoing bits.

2. The method of claim 1, wherein adjusting the bit length of at least one of the outgoing bits comprises:
   adding the clock period to the non-shifting signal section of at least one of the outgoing bits if the external field clock frequency is lower than the internal clock frequency; and
   removing the clock period from the non-shifting signal section of at least one of the outgoing bits if the external field clock frequency is higher than the internal clock frequency.

3. The method of claim 1, further comprising:
   modulating the outgoing bits into modulated signals using active modulation, wherein modulating the outgoing bits comprises generating an electromagnetic field; and
   transmitting the modulated signals through the electromagnetic field.

4. The method of claim 1, wherein the RFID equipped device comprises a contactless smart card.

5. The method of claim 1, further comprising:
   receiving wireless signals through an antenna of the RFID equipped device; and
   deriving the external field clock frequency from the received wireless signals.

6. The method of claim 1, wherein the RFID equipped device comprises a Near Field Communication (NFC) module, and wherein the method further comprises:
   receiving NFC wireless signals through an antenna of the NFC module; and
   deriving the external field clock frequency from the received NFC wireless signals.

7. The method of claim 1, wherein the RFID equipped device comprises a crystal oscillator configured to provide an internal clock signal that has the internal clock frequency.

8. The method of claim 1, wherein the RFID equipped device is a mobile hand-held communications device.

9. A radio frequency identification (RFID) equipped device comprising:
   a clock difference measurement unit configured to measure a difference between a field clock frequency generated from an external clock and an internal clock frequency generated from an internal clock; and a modulator configured to generate outgoing bits in response to the measured difference, wherein the modulator comprises a bit length adjustment unit configured to adjust the bit length of at least one of the outgoing bits in response to the measured difference while keeping an average bit length error of the outgoing bits below a predefined percentage threshold, wherein the bit length adjustment unit is configured to add a clock period to a non-shifting signal section of at least one of the outgoing bits or to remove a clock period from a non-shifting signal section of at least one of the outgoing bits.

10. The RFID equipped device of claim 9, wherein the bit length adjustment unit is further configured to:

add the clock period to the non-shifting signal section of at least one of the outgoing bits if the external field clock frequency is lower than the internal clock frequency; and remove the clock period from the non-shifting signal section of at least one of the outgoing bits if the external field clock frequency is higher than the internal clock frequency.

11. The RFID equipped device of claim 9, wherein the RFID equipped device comprises a contactless smart card.

12. The RFID equipped device of claim 9, further comprising an antenna configured to receive wireless signals, wherein the clock difference measurement unit is further configured to derive the external field clock frequency from the received wireless signals.

13. The RFID equipped device of claim 9, wherein the RFID equipped device comprises a Near Field Communication (NFC) module, wherein the NFC module comprises an antenna configured to receive NFC wireless signals, and wherein the clock difference measurement unit is further configured to derive the external field clock frequency from the received NFC wireless signals.

14. The RFID equipped device of claim 9, further comprising a crystal oscillator configured to provide an internal clock signal that has the internal clock frequency.

15. A hand-held communications device comprises the RFID equipped device of claim 9.

16. A hand-held communications device comprising:

a crystal oscillator configured to provide an internal clock signal; and a Near Field Communication (NFC) module comprising:

an antenna configured to receive NFC wireless signals;

a clock difference measurement unit configured to derive an external field clock frequency from the received NFC wireless signals and to measure a difference between the external field clock frequency and an internal clock frequency of the internal clock signal; and a modulator configured to generate outgoing bits in response to the measured difference, wherein the modulator comprises a bit length adjustment unit configured to add a clock period to a non-shifting signal section of one of the outgoing bits or to remove a clock period from a non-shifting signal section of one of the outgoing bits in response to the measured difference while keeping an average bit length error of the outgoing bits below a predefined percentage threshold.

17. The method of claim 1, wherein the predefined percentage threshold is 10% of a single bit length.

18. The method of claim 1, wherein measuring the difference between the field clock frequency generated from the external clock and the internal clock frequency generated from the internal clock comprises measuring the difference between the field clock frequency generated from the external clock and the internal clock frequency generated from the internal clock within a time period between the switching on of the external clock and the signal transmission from the RFID equipped device.

* * * * *